United States Patent
Lee et al.

(10) Patent No.: US 7,250,978 B2
(45) Date of Patent: Jul. 31, 2007

(54) MULTI-VISION SYSTEM AND METHOD OF CONTROLLING THE SAME

(75) Inventors: Woo Chul Lee, Gyeongsangbuk-do (KR); Dong Hyeon Kim, Daegu (KR)

(73) Assignee: LG Electronics Inc., Seoul (KR)

( * ) Notice: Subject to any disclaimer, the term of this patent is extended or adjusted under 35 U.S.C. 154(b) by 601 days.

(21) Appl. No.: 10/412,340

(22) Filed: Apr. 14, 2003

(65) Prior Publication Data

US 2004/0027482 A1 Feb. 12, 2004

(30) Foreign Application Priority Data

Aug. 9, 2002 (KR) ...................... 10-2002-0047108

(51) Int. Cl.
*H04N 5/66* (2006.01)
(52) U.S. Cl. ...................... 348/383; 348/588; 348/840
(58) Field of Classification Search ........ 348/564–565, 348/840, 383, 588; 345/1.1, 1.2, 2.1, 2.2, 345/2.3; *H04N 5/66*
See application file for complete search history.

(56) References Cited

U.S. PATENT DOCUMENTS

| | | | | |
|---|---|---|---|---|
| 4,800,376 A | * | 1/1989 | Suga et al. ................... | 345/1.3 |
| 5,987,532 A | * | 11/1999 | Tokui ............................. | 710/9 |
| 6,340,976 B1 | * | 1/2002 | Oguchi et al. ............... | 345/690 |
| 6,469,746 B1 | * | 10/2002 | Maida ......................... | 348/564 |
| 6,501,441 B1 | * | 12/2002 | Ludtke et al. ............... | 345/1.1 |
| 6,806,888 B2 | * | 10/2004 | Bhogal et al. .............. | 345/660 |
| 6,864,921 B2 | * | 3/2005 | Kaneda et al. .............. | 348/383 |

FOREIGN PATENT DOCUMENTS

| JP | 07-236183 | 9/1995 |
|---|---|---|
| WO | WO 99/66716 A1 | 12/1999 |

\* cited by examiner

*Primary Examiner*—Trang Tran
(74) *Attorney, Agent, or Firm*—Birch, Stewart, Kolasch & Birch, LLP (57) ABSTRACT

A multi-vision system and a method of controlling a display device usable in a multi-vision environment are disclosed. The multi-vision system includes a video source providing a video signal, a user input unit receiving multi-vision arrangement information from a user, a display device coupled to the video source for receiving the video signal. The display device, which is further coupled to the user input unit for receiving the arrangement information, initially determines an image portion of the video signal on the basis of the received arrangement information, adjusts a size of the determined image portion, and displays the size-adjusted image portion. The arrangement information indicates a user-preferred multi-vision arrangement and a position of the display device in the multi-vision arrangement.

28 Claims, 7 Drawing Sheets

MULTI-VISION SYSTEM AND METHOD OF CONTROLLING THE SAME

This application claims the benefit of the Korean Application No. P2002-47108 filed on Aug. 9, 2002, which is hereby incorporated by reference.

BACKGROUND OF THE INVENTION

1. Field of the Invention

The present invention relates to display devices, and more particularly, to a multi-vision system, and a method of controlling a plurality of a plurality of display devices in a multi-vision environment.

2. Discussion of the Related Art

As modern consumers prefer large-sized but slim display equipments, many researches for designing a display equipment that occupies a small space but has a large-scaled screen such as a liquid crystal display (LCD), a plasma display panel (PDP), a projector, and etc., have been actively made. Also, in various types of places such as stadiums, public performance theaters, exhibition halls, airports, and etc., where many people keep coming and going, the demand for a display equipment that can display having an extra-large-scaled screen with the occupancy of a small space has been rapidly increased. In order to meet this demand, multi-vision systems using equipments of PDPs, LCDs, projectors, CRTs, and etc., have been developed and diversely applied to real life and product exhibitions.

A conventional multi-vision system is provided with a video signal input source, a plurality of display devices, and an intermediate multi-vision control equipment, which is coupled to the video signal input source and the display devices for properly dividing a video signal provided from the video signal input source and for providing the divided video signals to the corresponding display devices.

A multi-vision display function is implemented to such intermediate signal control equipment in a manner that an operator, who has an expert knowledge related to the manipulation of the control equipment, controls the intermediate signal control equipment to properly distribute the video signal provided from the video signal input source to the respectively positioned display devices, and the display devices simply display the divided video signals.

However, the intermediate signal control equipment is extremely expensive, and a complex control technique is required to control, install and remove the control equipment. In addition, the conventional multi-vision implementation method has the following problems. First, since the conventional multi-vision implementation method uses an expensive intermediate signal control equipment installed between the video signal input source and the display devices, the total cost for the entire multi-vision system is very high. Second, since a complex control technique is required for implementation of the multi-vision using the intermediate signal control equipment, it is very difficult for an ordinary user to perform the multi-vision using easily. Lastly, due to difficulties in installing and removing the intermediate signal control equipment, it is difficult to efficiently implement the multi-vision display.

SUMMARY OF THE INVENTION

Accordingly, the present invention is directed to a multi-vision system and a method of controlling a plurality of display devices in a multi-vision environment that substantially obviate one or more problems due to limitations and disadvantages of the related art.

An object of the present invention is to provide a multi-vision system and a method of controlling a display device usable in a multi-vision environment that can implement a multi-vision display with a low cost and through a simple manipulation, and enables easy installation and removal of a multi-vision display function.

Another object of the present invention is to provide a multi-vision system and a method of controlling a plurality of display devices in a multi-vision environment that can implement a multi-vision display with a low cost and enables easy installation and removal of a multi-vision display function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a display device usable in a multi-vision environment includes the steps of receiving multi-vision arrangement information pertaining to the display device that indicates a multi-vision arrangement and a position of the display device in the multi-vision arrangement, determining an image portion of a video signal for the display device on the basis of the received arrangement information, and adjusting a size of the determined image portion and displaying the size-adjusted image portion on a display screen. The video signal is received from a video source.

The determining step described above includes the steps of determining a size of the image portion for the display device based on the multi-vision arrangement information and resolution information of the display device, and determining a starting point and an ending point of the image portion based on the determined image portion size. In addition, the step of receiving the arrangement information can be achieved by displaying multi-windows corresponding to the multi-vision arrangement on the display screen, and receiving a user's selection of one of the windows from the displayed multi-windows, which indicates the position of the display device in the multi-vision arrangement.

In another aspect of the present invention, a multi-vision system includes a video source providing a video signal, a user input unit receiving multi-vision arrangement information from a user, and a display device coupled to the video source and the user input unit for receiving the video signal and the arrangement information. The display device determines an image portion of the video signal on the basis of the received arrangement information, adjusts a size of the determined image portion, and displays the size-adjusted image portion. The video source can be any one of a personal computer (PC), a digital video disk (DVD) player, a television (TV), a video cassette recorder (VCR), a tuner, and a set-top box (STB), and the arrangement information indicates a multi-vision arrangement and a position of the display device in the multi-vision arrangement.

The display device described above includes a control unit coupled to the user input unit for receiving the multi-vision arrangement information, where the control unit determines the image portion of the video signal on the basis of the received arrangement information and generates a control signal that indicates the determined image portion. The display device further includes a video processor coupled to the video source for receiving the video signal. The video processor is further coupled to the control unit for receiving the control signal, and it adjusts a size of the determined image portion which is indicated by the control signal. Lastly, the display device includes a display unit, which can be any one of a liquid crystal display (LCD), a plasma display panel (PDP), and a projector, for displaying the size-adjusted image portion.

In another aspect of the present invention, a method of controlling a plurality of display devices in a multi-vision environment includes the steps of receiving multi-vision arrangement information pertaining to the display devices, designating a device ID to each of the display devices, determining an image portion of a video signal for each of the ID-designated display devices based on the received arrangement information, and generating a control signal to each of the ID-designated display devices, where the control signal indicates the determined image portion. At least one of the receiving, designating, determining and generating steps is performed by a computer or a video input source device operatively coupled to the plurality of display devices.

In another aspect of the present invention, a multi-vision system includes a video source providing a video signal, a plurality of display devices coupled to the video source for receiving the video signal, and a computer receiving multi-vision arrangement information and determining an image portion of the video signal for each of the display devices based on the received arrangement information. The computer is operatively coupled to each of the display devices through a communication line (e.g., RS232C) for transmitting a control signal that indicates the determined image portion, and each of the display devices adjusts a size of the determined image portion and displays the size-adjusted image portion. Each of the display devices includes a video processor, which is coupled to the video source for receiving the video signal and is operatively coupled to the computer for receiving the control signal and adjusting the size of the image portion indicated by the control signal, and a display unit coupled to the video processor for displaying the size-adjusted image portion.

In another aspect of the present invention, a multi-vision system includes a plurality of display devices, each of which receives a video signal, and a video source coupled to the display devices for transmitting the video signal. The video source further receives multi-vision arrangement information and determines an image portion of the video signal for each of the display devices based on the received arrangement information. In addition, the video source is further coupled to each of the display devices through a communication line (e.g., RS232C) for transmitting a control signal that indicates the determined image portion, where each of the display devices adjusts a size of the determined image portion and displays the size-adjusted image portion. Each of the display devices includes a video processor, which is coupled to the video source for receiving the video signal and is further operatively coupled to the video source for receiving the control signal and adjusting the size of the image portion indicated by the control signal, and a display unit coupled to the video processor for displaying the size-adjusted image portion.

In another aspect of the present invention, a computer-program product embodied on computer readable media for controlling a plurality of display devices in multi-vision environment includes computer-executable instructions for receiving multi-vision arrangement information pertaining to the display devices, designating a device ID to each of the display devices, determining an image portion of a video signal for each of the ID-designated display devices based on the received arrangement information, and generating a control signal, which indicates the determined image portion, to each of the ID-designated display devices. The computer program product described above is stored in a computer or in a video input source device operatively coupled to the plurality of display devices.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention has a total of three embodiments. The first embodiment relates to the use of a zoom function and a multi-screen function menu of a display device usable in a multi-vision environment, the second embodiment relates to the control of zoom areas of the display sets by a computer (e.g., PC) operatively connected to the display sets through a communication line (RS-232C), and the third embodiment relates to the control of zoom areas of the display sets by an image signal input source operatively connected to the display sets through a communication line (e.g., RS-232C). Hereinafter, these embodiments of the present invention will be described in detail

FIRST EMBODIMENT

In this section, a multi-vision system and a method of controlling a display device usable in a multi-vision environment according to the first embodiment of the present invention will be described.

Figure 1:
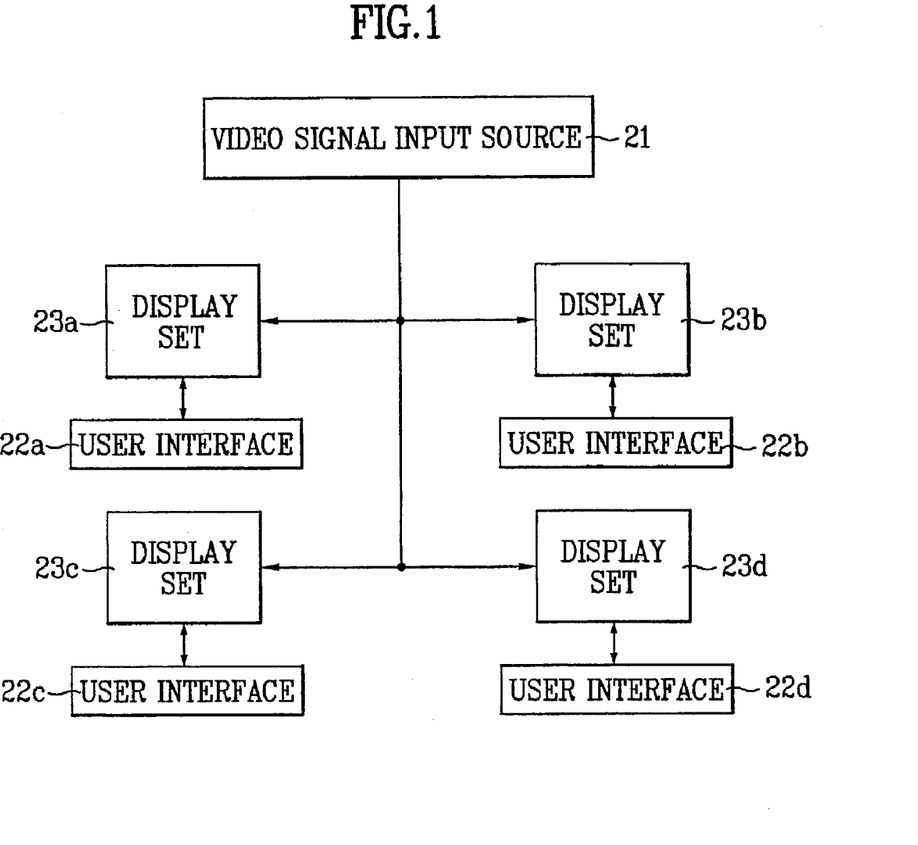
FIG. 1 is a block diagram illustrating a multi-vision system according to a first embodiment of the present invention.

FIG. 1 is a block diagram illustrating a multi-vision system according to the first embodiment of the present invention. The multi-vision system shown in FIG. 1, includes a video signal input source 21, a plurality of display devices 23a, 23b, 23c and 23d (hereinafter referred to as "display sets"), and a user interface unit (e.g., a remote control unit) 22a, 22b, 22c and 22d coupled to each display set. The video signal input source 21, which can be any one of a personal computer (PC), a digital video disk (DVD) player, a television (TV), a video cassette recorder (VCR), a tuner, a set-top box (STB), or any other electrical system being able to generates a video signal, generates a video signal representing an original image and provides the video signal to each of the plurality of display sets 23a, 23b, 23c and 23d. Thereafter, each display set initially receives multi-vision arrangement information from a user, determines a size of a corresponding zoom area subdivided from the original image based on the received multi-vision arrangement information, determines the zoom area on the basis of the determined zoom area size, adjusts the size of the determined zoom area in accordance with a size of a display screen, and finally displays the size-adjusted zoom area of the original image on the display screen. In order to use each display set as a multi-vision function controller, a multi-vision display program (e.g., menu program) for receiving the multi-vision arrangement information is installed to each display set.

Figure 2:
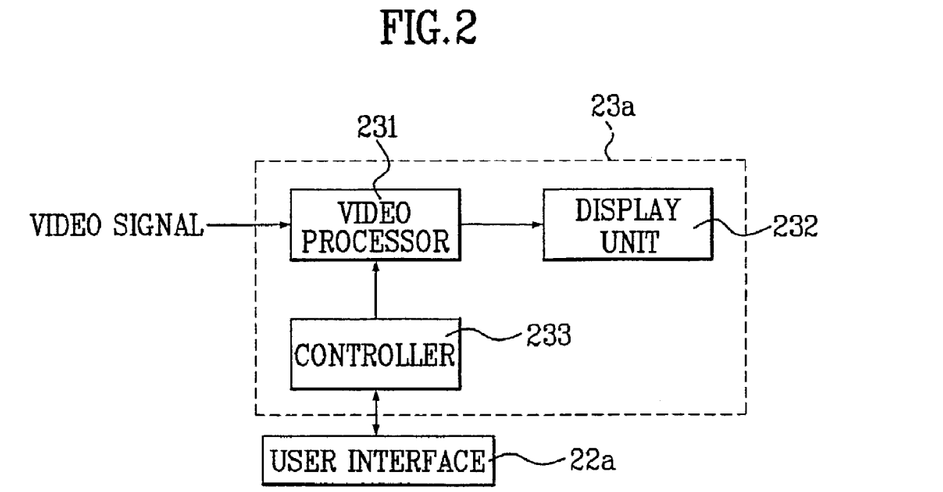
FIG. 2 is a block diagram illustrating each display device shown in FIG. 1.

FIG. 2 is a block diagram illustrating each display set (e.g., display set 23a) shown in FIG. 1 as an example. The constructions of all other display sets 23b, 23c, and 23d are identical to that of the display set 23a shown in FIG. 2. According to FIG. 2, the display set 23a includes a controller 233, a video processor 231, and a display unit 232. The controller 233 initially receives the multi-vision arrangement information from a user via the user interface 22a (e.g., a remote control unit). Then the controller 233 determines a size of a corresponding zoom area based on the multi-vision arrangement information received, determines the zoom area on the basis of the determined zoom size, and sends a control signal indicating the determined zoom area to the video processor 231. Then the video processor 31, which receives a video signal from the video signal input source 21, adjusts the size of the determined zoom area in accordance with a screen size of the display unit 232. Finally, the display unit 232, which can be one of a liquid crystal display (LCD), a plasma display panel (PDP), and a projector, displays the size-adjusted zoom area of the original image.

Figure 3:
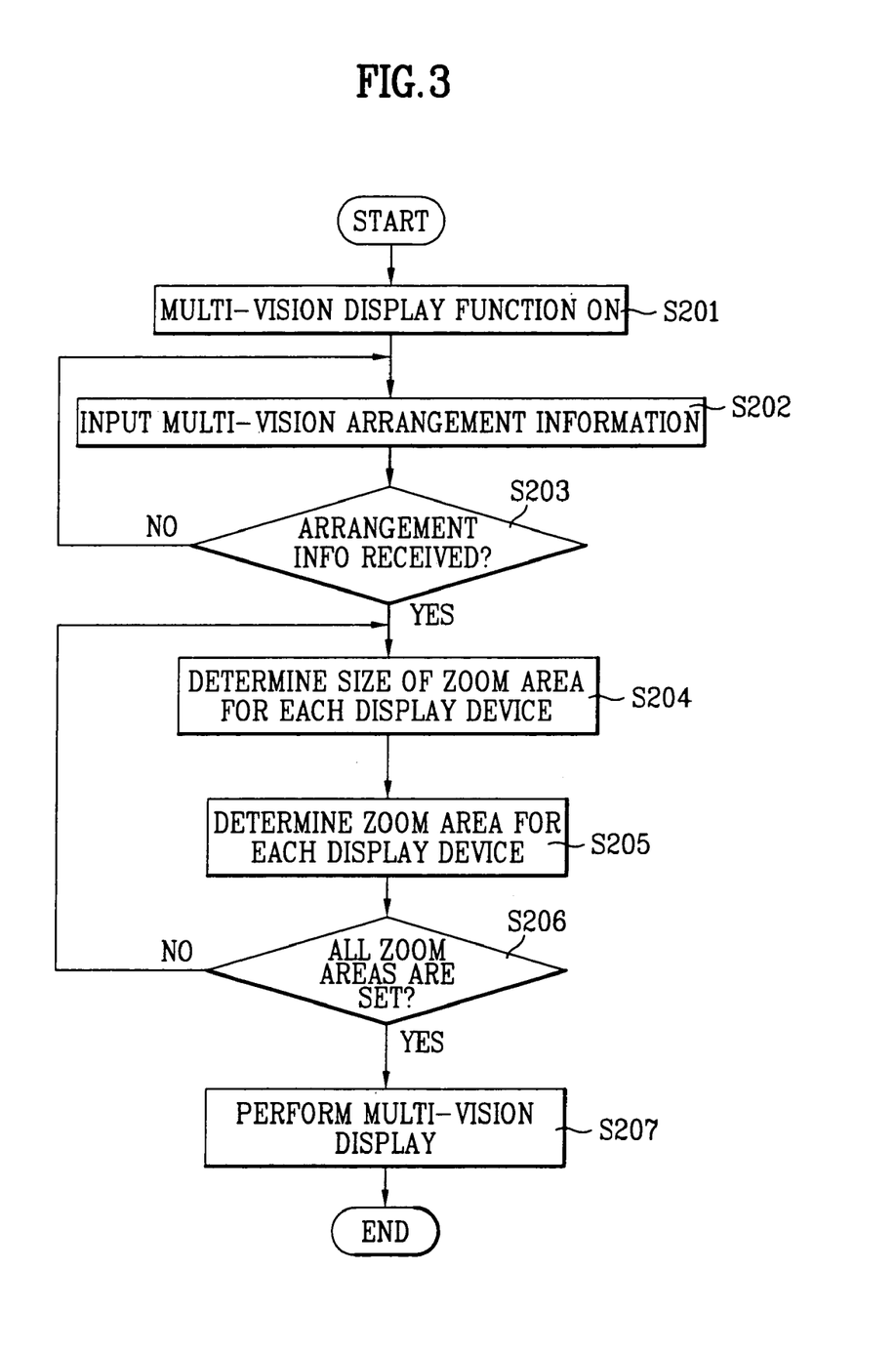
FIG. 3 is a flowchart illustrating a method of controlling a display device in a multi-vision environment according to a first embodiment of the present invention.

FIG. 3 is a flowchart illustrating a method of controlling a display device usable in a multi-vision environment according to the first embodiment of the present invention. Initially, a user turns a multi-vision display function on for the display set 23a using the user interface unit 22a (e.g., a remote controller) (step S201). Next, the display set 23a receives multi-vision display arrangement information from a user via the user interface 22a (step S202). The arrangement information includes a user-preferred multi-vision display arrangement in a form of X*Y matrix and a user-preferred position C*R of the display set 23a in the X*Y arrangement. X and Y represent a total number of columns and a total number of rows that form a desired multi-vision display arrangement, respectively. The position C-R indicates that the display set 23a should be positioned in Cth column and Rth row within the X*Y arrangement. Alternatively, the step of receiving the arrangement information can be achieved by displaying multi-windows corresponding to the multi-vision arrangement on a display screen, and receiving a user's selection of one of the windows from the displayed multi-windows, which indicates the position of the display device 23a in the multi-vision arrangement. After the user inputs the display arrangement information for the display set 23a in step S202, the user repeats steps S201 and S202 for all other display sets 23b, 23c, and 23d in an identical manner.

After the arrangement information for the display set 23b is received in step S202, the controller 233 included in the display set 23a determines whether the multi-vision arrangement information has been received (step S203). If it is determined in step S203 that the arrangement information is received, then the controller 233 of the display set 23a determines a size of a corresponding zoom area according to the X*Y matrix value and a resolution of the display set 23a (step S204). For example, if the resolution of the display set 23a is 1024*768 and the multi-vision display arrangement matrix is 2*2, then the size of the zoom area should be 512*384. Thereafter, the controller 233 determines the zoom area on the basis of the zoom area size and transmits a control signal indicating the determined zoom area to the video processor 231 (step S205).

In step S205, the controller 233 determines the zoom area by designating a starting point and an end point of the zoom area based on the determined zoom area size. For example, if the resolution of the display set is 1024*768 and the multi-vision display arrangement matrix is 2*2 so that the zoom area size is determined to be 512*384, the zoom area for the position 1-1 (first column and first row) is determined to be (0,0)~(512, 384). Similarly, the controller included in other display sets 23b, 23c and 23d repeats steps S203, S204 and S205. The zoom areas for other positions 1-2, 2-1, and 2-2 are determined to be (513, 0)~(1024, 384), (0, 385)~(512, 768), and (513, 385)~(1024, 768), respectively. Finally, when all the zoom areas for the plurality of display sets are determined (step S206), a multi-vision display is carried out (step S207).

Figure 4A:
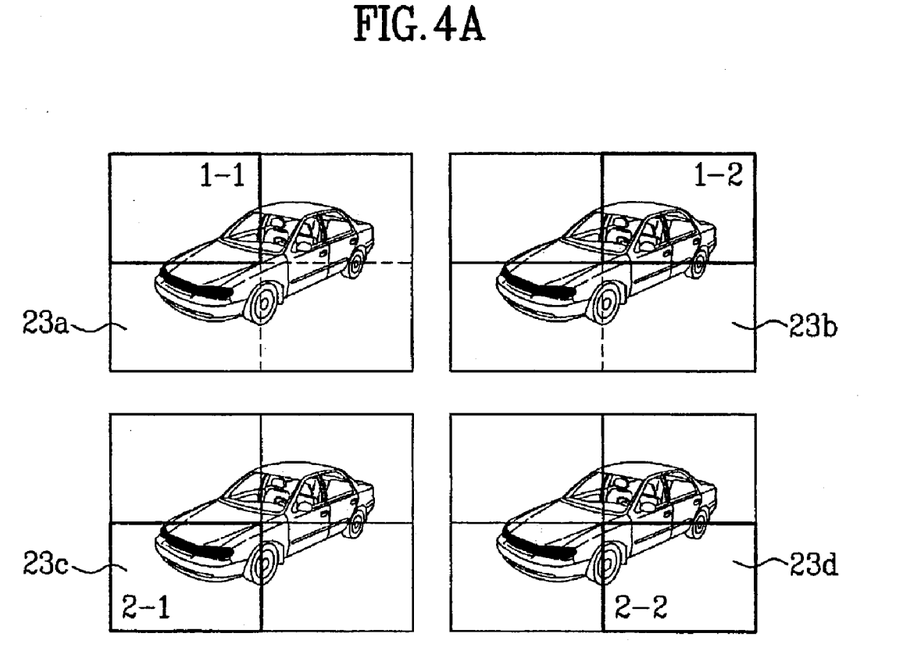
FIGS. 4A and 4B illustrates an example that shows how a multi-vision display with a multi-vision display arrangement of a 2*2 matrix is carried out according to the first embodiment of the present invention.
Figure 4B:
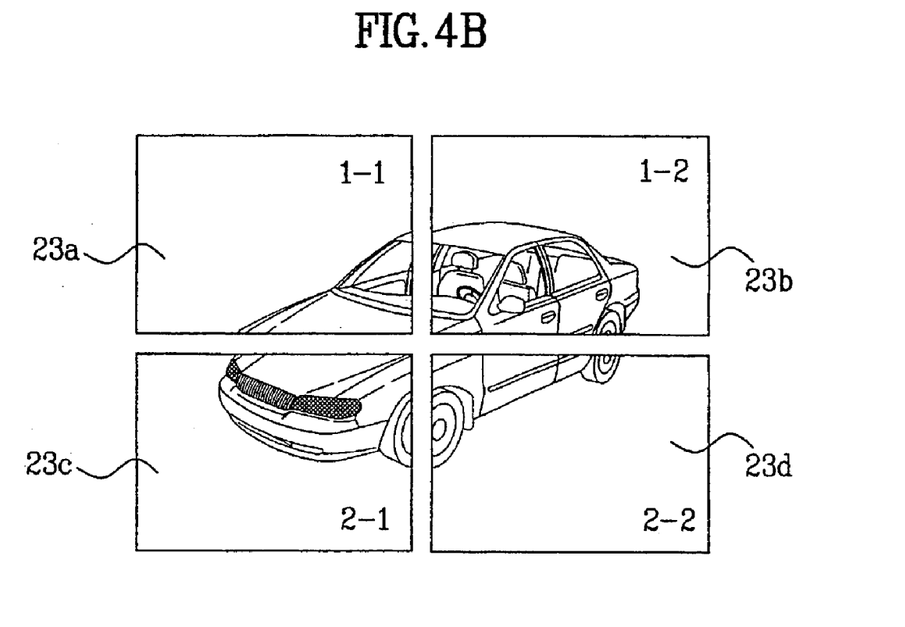

FIGS. 4A and 4B illustrate an example that shows how a multi-vision display with a multi-vision display arrangement of a 2*2 matrix is carried out for the plurality of display sets 23a, 23b, 23c, and 23d. In step S207, the video processor 231 receives the control signal indicating the position information of the determined zoom area (e.g., (0, 0)~(512, 384)) from the controller 233, and it adjusts the size of the determined zoom area according to its display screen size. Then it outputs the size-adjusted image to the display unit 232 to fully display the size-adjusted image. Similarly, other display sets 23b, 23c and 23d repeat these processes so that the original image is properly divided into a number of sub-images and the sub-images are displayed on the display sets as shown in FIGS. 4A and 4B. In the example described above, the multi-vision display arrangement of a 2*2 matrix and a resolution of 1024*768 are used. However, the present invention can be applied to any other multi-vision arrangement such as 3*3, 4*4, or 3*4 and any other resolution such as 800*600 or 1280*1024.

SECOND EMBODIMENT

Figure 5:
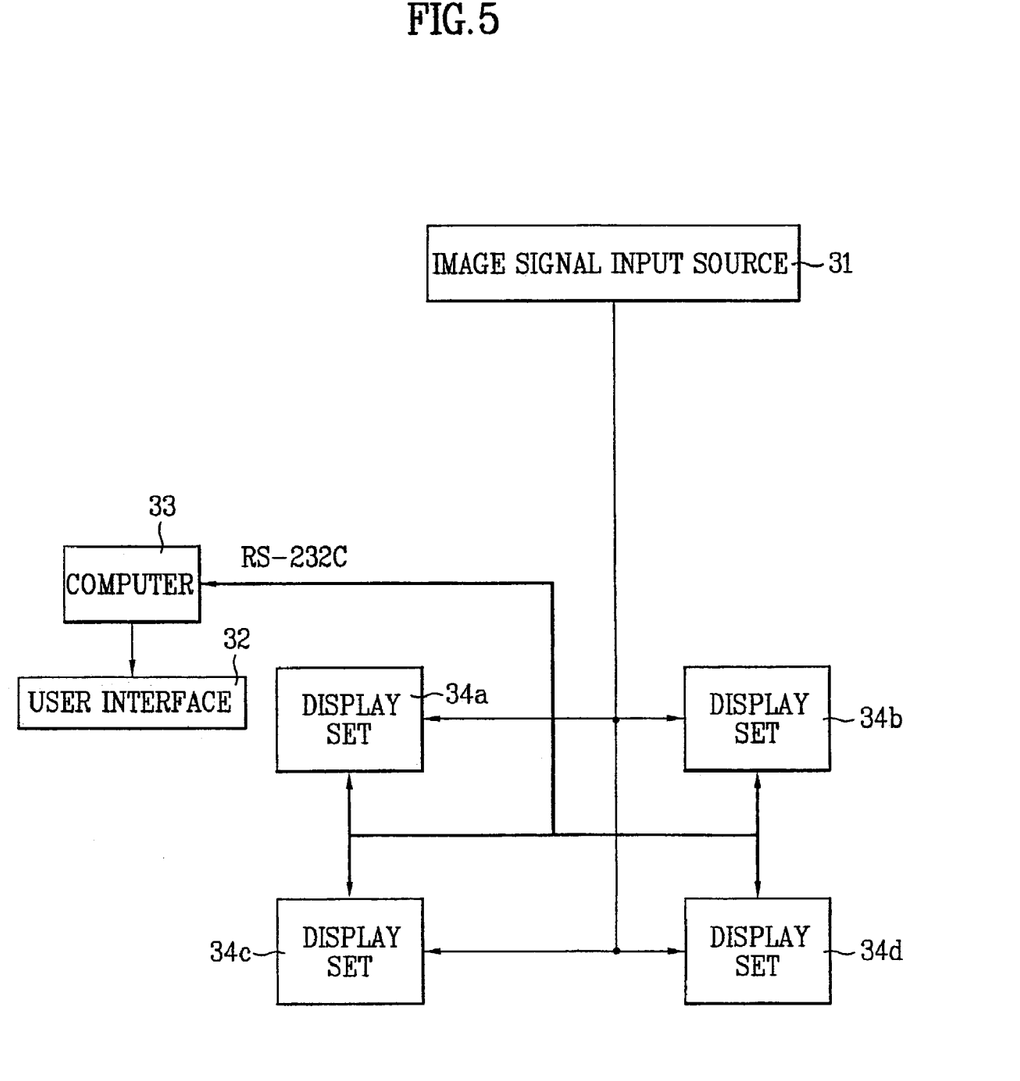
FIG. 5 is a block diagram illustrating a multi-vision system according to a second embodiment of the present invention.
Figure 6:
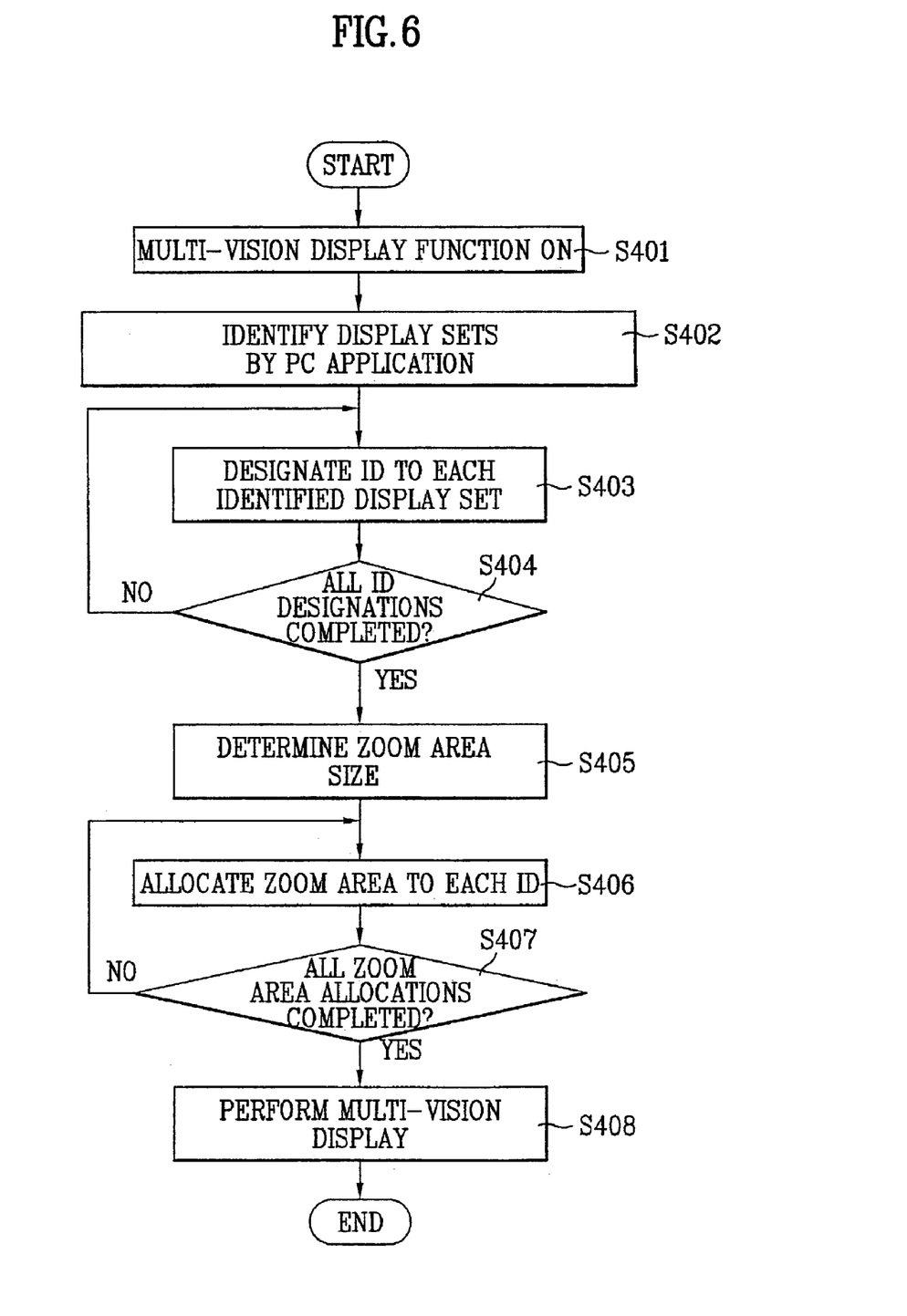
FIG. 6 is a flowchart illustrating a method of controlling a plurality of display devices in a multi-vision environment according to a second embodiment of the present invention.

In this section, a multi-vision system and a method of controlling a plurality of display devices according to the second embodiment of the present invention will be explained in detail. FIG. 5 is a block diagram illustrating the multi-vision system according to the second embodiment of the present invention, and FIG. 6 is a flowchart illustrating the method according to the second embodiment of the present invention.

In the method according to the second embodiment of the present invention, the zoom areas of the display devices are determined by a computer, which is operatively connected to the display devices through a communication line (e.g., RS232C line). In the second embodiment of the present invention, all the zoom areas of the display devices are determined by a multi-vision management program of the computer, and thus a smooth and magnificent multi-vision implementation can be achieved.

The multi-vision system shown in FIG. 5 includes an image signal input source 31 providing a video signal representative of an original image, a plurality of display devices (hereinafter, "display sets") 34a, 34b, 34c and 34d coupled to the image signal input source 31 for receiving the video signal, and a computer 33. The computer initially receives multi-vision arrangement information, designates a device identification (ID) to each of the display sets 34a, 34b, 34c and 34d, and determines a portion of the original image for each of the display sets based on the received arrangement information. The computer 33 is operatively coupled to each of the display sets 34a, 34b, 34c and 34d through a communication line (e.g., RS232C line) for transmitting a control signal that indicates the determined image portion, where each of the display sets 34a, 34b, 34c and 34d adjusts a size of the image portion indicated by the control signal and displays the size-adjusted image portion of the original image.

The image signal input source 31 can be any one of a personal computer (PC), a digital video disk (DVD) player, a television (TV), a video cassette recorder (VCR), a tuner, a set-top box (STB), or any other electrical system being able to generates a video signal. In addition, each of the display sets 34a, 34b, 34c and 34d includes a video processor (not illustrated), which is coupled to the image signal input source 31 for receiving the video signal and is further operatively coupled to the computer 33 through the communication line for receiving the control signal and adjusting a size of the image portion indicated by the control signal, and a display unit (not illustrated) coupled to the video processor for displaying the size-adjusted image portion. For example, the video processor can be any one of Image Processor PW465-10 or JAG-ASM made by Pixelworks, and the display unit can be any one of a liquid crystal display (LCD), a plasma display panel (PDP), and a projector.

In order to use the computer 33 as a multi-vision display controller, a menu program for receiving the multi-vision arrangement information, designating the device IDs, determining the zoom areas, generating the control signals, and performing an on/off function of the multi-vision is installed in the computer 33. Since a large-capacity data input/output is possible according to the characteristics of the computer, the program installation can be easily performed through an external storage device or a communication network such as the Internet.

The method of controlling the plurality of display sets 34a, 34b, 34c and 34d shown in FIG. 5 according to the second embodiment of the present invention will now be described in detail, an example of which is illustrated in FIG. 6. First, a multi-vision display function is turned on by a user via the user interface 32 coupled to the computer 33 (step S401). Next, the multi-vision management program of the computer 33, which is operatively connected to the display sets 34a, 34b, 34c and 34d through an RS-232C communication line for the actual multi-vision implementation, identifies the display sets 34a, 34b, 34c, and 34d and receives multi-vision arrangement information pertaining to the display devices 34a, 34b, 34c, and 34d (step S402). Any display set not connected to the computer 33 will display the entire original image if it is connected to the image signal input source 31. The received arrangement information includes a user-preferred multi-vision display arrangement in a form of X*Y matrix and a position C*R of each display set in the X*Y arrangement. X and Y represent a total number of columns and a total number of rows that form a multi-vision display arrangement, respectively. The position C-R indicates that the corresponding display set should be positioned in Cth column and Rth row within the X*Y arrangement.

Thereafter, the computer 33 designates a device ID to each of the display sets 34a, 34b, 34c and 34d, which are used for the multi-vision implementation, on the basis of their positions in the multi-vision display arrangement (step S403). The designation of the IDs of the respective display sets to be used for the multi-vision implementation is performed according to the multi-vision display arrangement and the positions of the display sets in the arrangement, for example, from left to right and from top to bottom. That is, the left and upper set has the highest priority, and the right and lower set has the lowest priority.

Then, it is determined whether the device IDs for all the display sets 34a, 34b, 34c, and 34d are designated (step S404). If they are, then the computer 33 initially determines a size of a portion of an original image corresponding to each of the ID-designated display sets on the basis of the X*Y matrix value and resolution information of each display set, and it further determines the image portion for each ID-designated display set by determining a starting point and an ending point of the image portion on the basis of the determined image portion size (step S405). For example, if the resolution of the display set 34a is 1024*768 and the multi-vision arrangement matrix is 2*2, then the size of the image portion of the display set 34a should be 512*384. Then the image portion of the display set 34a is determined to be (0,0)~(512, 384). Similarly, the image portions of the display sets 34b, 34c and 34d are determined to be (513, 0)~(1024, 384), (0, 385)~(512, 768), and (513, 385)~(1024, 768), respectively.

After the image portion of each display set is determined in step S405, the computer 33 allocates the determined image portion to each device ID (step S406). If it is determined that the respective image portions are allocated to all the device IDs (step S407), the computer 33 generates a control signal, which indicates the determined image portion, to each of the ID-designated display sets (step S408). Upon receiving the control signal, each of the ID-designated display sets adjusts a size of the image portion indicated by the control signal and displays the size-adjusted image portion (step S408).

As described above, the multi-vision implementation method according to the second embodiment of the present invention uses the management program of the computer, and this enables the diverse picture implementations.

THIRD EMBODIMENT

Figure 7:
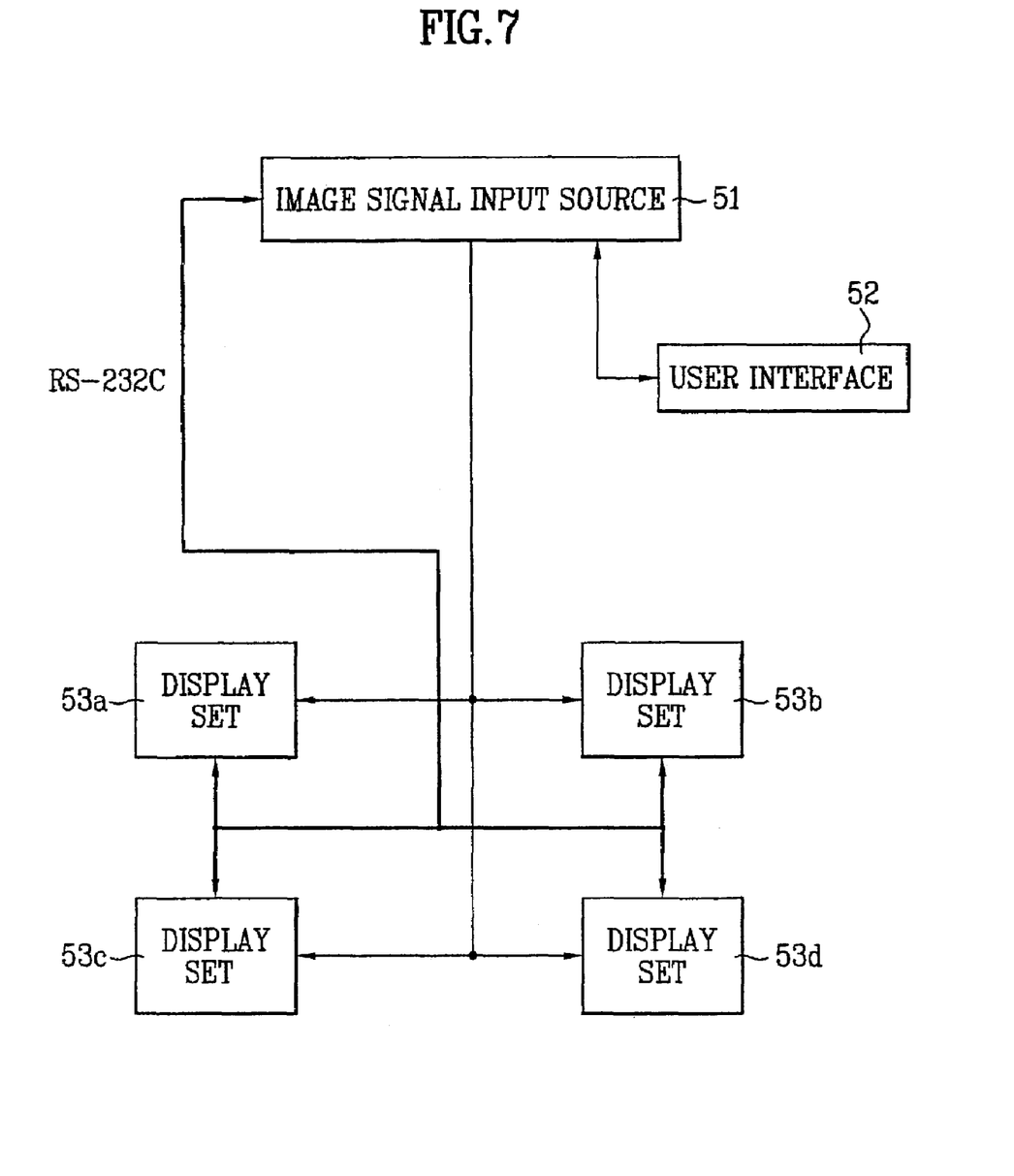
FIG. 7 is a block diagram illustrating a multi-vision system according to a third embodiment of the present invention.
Figure 8:
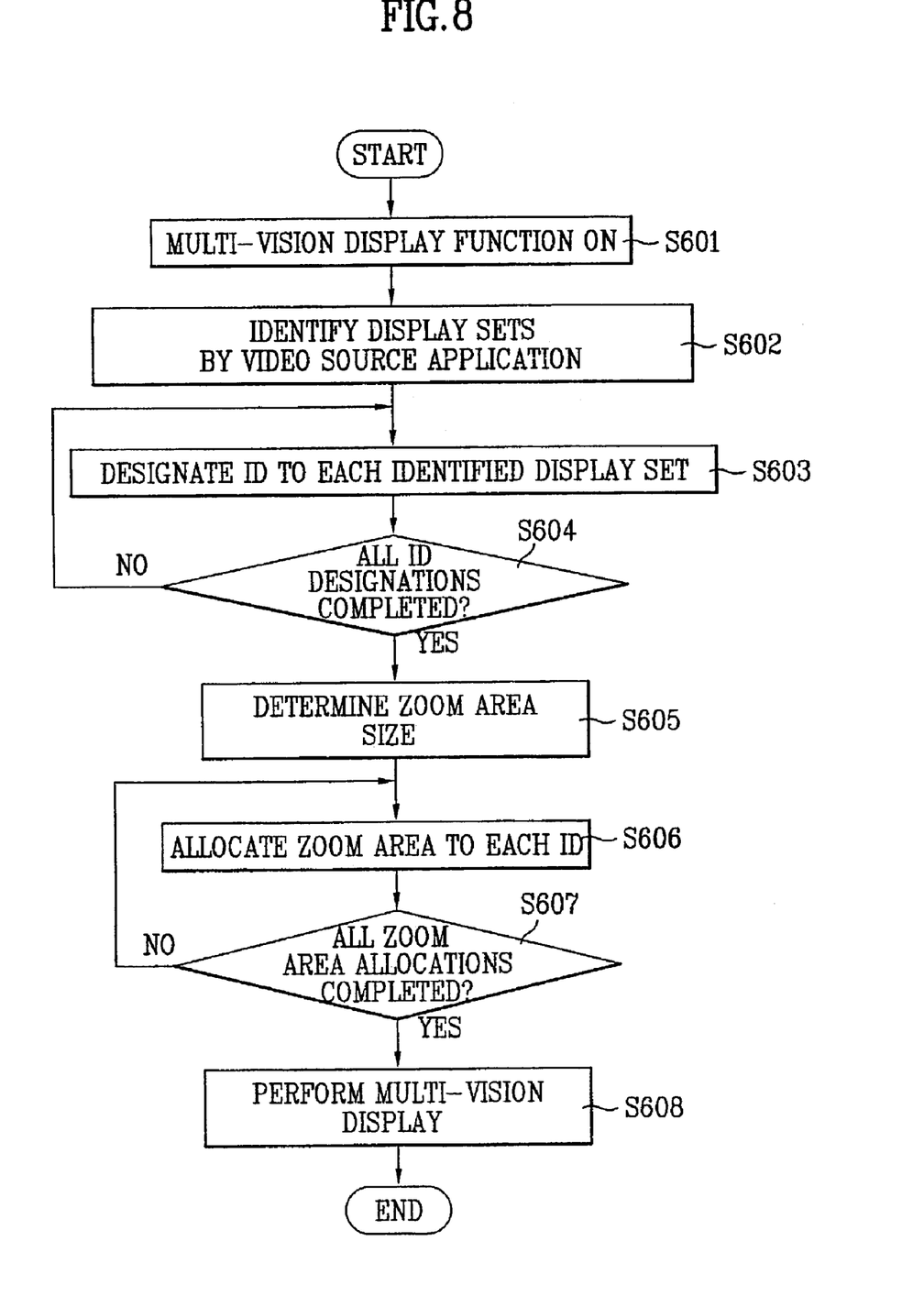
FIG. 8 is a flowchart illustrating a method of controlling a plurality of display devices in a multi-vision environment according to a third embodiment of the present invention.

In this section, a multi-vision system and a method of controlling a plurality of display devices in a multi-vision environment according to the third embodiment of the present invention will be described in detail. FIG. 7 is a block diagram illustrating the multi-vision system according to the third embodiment of the present invention, and FIG. 8 is a flowchart illustrating the method according to the third embodiment of the present invention. In the method according to the third embodiment of the present invention, the zoom areas of the display devices are determined by a multi-vision management program installed in an image signal input source, which is operatively connected to the display devices through a communication line (e.g., RS232C line).

The multi-vision system shown in FIG. 7 includes an a plurality of display devices (hereinafter, "display sets") 53a, 53b, 53c and 53d, each of which receiving a video signal representative of an original image, and an image signal input source 51 coupled to the display sets 53a, 53b, 53c and 53d for transmitting the video signal. The image signal input source 51 initially receives multi-vision arrangement information, designates a device identification (ID) to each of the display sets 53a, 53b, 53c and 53d, and determines a portion of the original image for each of the display sets 53a, 53b, 53c and 53d based on the received arrangement information. In addition, the image signal input source 51 is further operatively coupled to each of the display sets 53a, 53b, 53c and 55d through a communication line (e.g., RS232C line) for transmitting a control signal that indicates the determined image portion, where each of the display sets 53a, 53b, 53c and 53d adjusts a size of the image portion indicated by the control signal and displays the size-adjusted image portion.

The image signal input source 31 can be any one of a personal computer (PC), a digital video disk (DVD) player, a television (TV), a video cassette recorder (VCR), a tuner, a set-up box (STB), or any other electrical system being able to generates a video signal. In addition, each of the display sets 53a, 53b, 53c and 53d includes a video processor (not illustrated), which is coupled to the image signal input source 51 for receiving the video signal and is further operatively coupled to the image signal input source 51 through the communication line for receiving the control signal and adjusting a size of the image portion indicated by the control signal, and a display unit (not illustrated) coupled to the video processor for displaying the size-adjusted image portion of the original image. For example, the video processor can be any one of Image Processor PW465-10 or JAG-ASM made by Pixelworks, and the display unit can be any one of a liquid crystal display (LCD), a plasma display panel (PDP), and a projector.

In order to use the image signal input source 51 as a multi-vision display controller, a multi-vision control program for receiving the multi-vision arrangement information, designating the device IDs, determining the portion of the original image, and performing an on/off function of a multi-vision display is installed in the image signal input source 51.

The method of controlling the plurality of the display sets 53a, 53b, 53c and 55d shown in FIG. 7 according to the third embodiment of the present invention will now be described in detail, an example of which is illustrated in FIG. 8. First, a multi-vision display function is turned on by a user via the user interface 52 coupled to the image signal input source 51 (step S601). Next, the multi-vision management program installed in the image signal input source 51, which is operatively connected to the display sets 53a, 53b, 53c and 53d through an RS-232C communication line, identifies the display sets 53a, 53b, 53c and 53d used for the actual multi-vision implementation and receives multi-vision arrangement pertaining to the display sets 53a, 53b, 53c and 53d (S602). The received arrangement information includes a user-preferred multi-vision display arrangement in a form of X*Y matrix and a position C*R of each display set in the X*Y arrangement. X and Y represent a total number of columns and a total number of rows that form a multi-vision display arrangement, respectively. The position C-R indicates that the corresponding display set should be positioned in Cth column and Rth row within the X*Y arrangement.

Thereafter, the image signal input source 51 designates a device ID to each of the identified display sets 53a, 53b, 53c and 53d, which are used for the multi-vision implementation, on the basis of their positions in the multi-vision display arrangement (step S603).

Then, it is determined whether the device IDs for all the display sets 53a, 53b, 53c and 53d are designated (step S604). If they are, then the image signal input source 51 determines a size of a portion of an original image corresponding the each of the ID-designated display sets on the basis of the X*Y matrix value and resolution information of each ID-designated display set, and it further determines the image portion for each ID-designated display set by determining a starting point and an ending point of the image portion on the basis of the determined image portion size (step S605). For example, if the resolution of the display set 53a is 1024*768 and the multi-vision arrangement matrix is 2*2, then the size of the image portion for the display set 53a should be 512*384. Then the image portion of the display set 53a is determined to be (0,0)~(512, 384). Similarly, the image portions of the display sets 53b, 53c and 53d are determined to be (513, 0)~(1024, 384), (0, 385)~(512, 768), and (513, 385)~(1024, 768), respectively.

After the image portion of each ID-designated display set is determined in step S605, the image signal input source 51 allocates the determined image portion to each device ID (step S606). If it is determined that the respective image portions are allocated to all the device IDs (step 607), the image signal input source 51 generates a control signal, which indicates the determined image portion, to each of the ID-designated display sets (step S608). Upon receiving the control signal, each of the ID-designated displays sets adjusts a size of the image portion indicated by the control signal and displays the size-adjusted image portion (step S608).

The multi-vision systems and the methods of controlling one or more display devices according to the first, second and third embodiments of the present invention have the following advantages. First, the present invention can implement a multi-vision display easily and quickly by using the function of the display sets themselves or the control through the PC without any expensive intermediate equipment, and thus it can reduce the cost of the installation and removal of the equipment. Second, the present invention enables diverse applications through user's simple manipulation, and thus can heighten the efficiency of the multi-vision implementation. Third, the present invention can provide a smooth and composite multi-vision implementation in the applications through the RS-232C port control.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of controlling a display device usable in a multi-vision environment, the method comprising:
   displaying an entire original image corresponding to a received video signal in a multi-windows format on a display screen of the display device;
   receiving multi-vision arrangement information pertaining to the display device and corresponding to the multi-windows format;
   determining an image portion of the video signal for the display device on the basis of the received arrangement information, the video signal being received from a video source; and
   adjusting a size of the determined image portion and displaying the size adjusted image portion on the display screen instead of the entire original image,
   wherein the multi-vision arrangement information indicates a multi-vision arrangement including the display device and indicates a position of the display device within the multi-vision arrangement.

2. The method of claim 1, wherein the determining step includes:
   determining the size of the image portion based on the multi-vision arrangement information and resolution information of the display device; and
   determining a starting point and an ending point of the image portion based on the determined image portion size.

3. The method of claim 1, wherein the multi-vision arrangement is an X*Y matrix and the multi-vision arrangement information includes column and row information indicating a physical position of the display device that corresponds to a logical position in the X*Y matrix.

4. The method of claim 1, wherein the receiving step includes:
   receiving a user's selection of one of the multi-windows from the entire original image displayed in the multi-windows format, the received user's selection indicating a relative position of the display device within the multi-vision arrangement.

5. A multi-system system comprising:
   a video source providing a video signal;
   a user input unit receiving multi-vision arrangement information from a user; and
   a display device coupled to the video source and the user input unit for receiving the video signal and multi-vision the arrangement information,
   wherein the display device displays an entire original image corresponding to a received video signal in a multi-windows format on a display screen of the display device, determines an image portion of the video signal on the basis of the received multi-vision arrangement information, adjusts a size of the determined image portion, and displays the size adjusted image portion on the display screen instead of the entire original image,
   wherein the multi-vision arrangement information indicates a multi-vision arrangement and indicates by column and row a physical position of the display device within the multi-vision arrangement, and
   wherein the multi-vision arrangement includes the display device and corresponds to the multi-windows format.

6. The multi-vision system of claim 5, wherein the video source is any one of a personal computer (PC), a digital video disk (DVD) player, a television (TV), a video cassette recorder (VCR), a tuner, and a set top box (STB).

7. The multi-vision system of claim 5, wherein the display device comprises:
   a control unit coupled to the user input unit for receiving the multi-vision arrangement information,
   wherein the control unit determines the image portion of video signal on the basis of the received multi-vision arrangement information and generates a control signal that indicates the determined image portion;
   a video processor coupled to the video source for receiving the video signal, the video processor being coupled to the control unit for receiving the control signal and adjusting a size of the determined image portion which is indicated by the control signal; and
   a display unit coupled to the video processor for displaying the size adjusted image portion.

8. The multi-vision system of claim 7, wherein the display unit is any one of a liquid crystal display (LCD), a plasma display panel (PDP), and a projector.

9. A method of controlling a display device in a multi-vision environment, the method comprising:
   receiving a video signal at the display device;
   inputting multi-vision arrangement information to the display device, the multi-vision arrangement information defining an X×Y matrix and identifying a relative position of the display device with respect to the X×Y matrix, by displaying on a display screen of the display device a set of windows arranged in correspondence to the X×Y matrix and selecting one window from the displayed windows, the selected window corresponding to the relative position of the display device;
   assigning to the display device an image portion of the received video signal based on the input multi-vision arrangement information;
   scaling the assigned image portion according to a display resolution of the display device; and
   displaying the scaled image portions,
   wherein the X×Y matrix is a logical representation of a multi-vision arrangement that includes the display device.

10. The method of claim 9, wherein each window is displayed according to a size of a zoom area of the displayed video signal.

11. The method of claim 10, wherein the selected window is based on a visual observation of the zoom areas.

12. The method of claim 9, wherein the multi-vision arrangement information is input to the display device by a user.

13. The method of claim 9, wherein each window has a size equal to a zoom area of the displayed video signal.

14. The method of claim 13, wherein the image portion has a starting point and an ending point, which are determined based on the size of the corresponding window.

15. The method of claim 9, wherein each window is displayed according to the multi-vision arrangement information and resolution information of the display device.

16. The method of claim 9, wherein the multi-vision arrangement information includes column and row information indicating the relative position of the display device.

17. The method of claim 9, further comprising:
   displaying on the display screen of the display device the received video signal according to the display resolution of the display device,
   wherein the set of windows is displayed together with the received video signal.

18. A multi-vision system, comprising:
a display device for receiving a video signal; and
a user interface for inputting multi-vision arrangement information to said display device, the multi-vision arrangement information defining an X×Y matrix and identifying a relative position of said display device with respect to the X×Y matrix, by displaying on a display screen of said display device a set of windows arranged in correspondence to the X×Y matrix and selecting one window from the displayed windows, the selected window corresponding to the relative position of said display device,
wherein said display device includes a controller for assigning to the display device an image portion of the received video signal based on the input multi-vision arrangement information, a video processor for scaling the assigned image portion according to a display resolution of said display device, and a display unit for displaying the scaled image portion, and
wherein the X×Y matrix is a logical representation of a multi-vision arrangement that includes said display device.

19. The multi-vision system of claim 18, further comprising a source outputting the video signal.

20. The multi-vision system of claim 18, wherein the video signal source is one of a personal computer, a digital video disk player, a television, a videocassette recorder, a tuner, and a set-top box.

21. The multi-vision system of claim 18, wherein the display unit is one of a liquid crystal display, a plasma display panel, and a projector.

22. A method of controlling a multi-vision system comprising a plurality of display devices, the method comprising:
(a) simultaneously receiving a video signal at each display device;
(b) inputting multi-vision arrangement information to at least one display device, the multi-vision arrangement information defining an X×Y matrix and identifying a relative position of the at least one display device with respect to the X×Y matrix, by displaying on a display screen of the at least one display device a set of windows arranged in correspondence to the X×Y matrix and selecting one window from the displayed windows, the selected window corresponding to the relative position of the at least one display device;
(c) assigning to the at least one display device an image portion of the received video signal based on the input multi-vision arrangement information; and
(d) scaling the assigned image portion according to a display resolution of the at least one display device,
wherein the X×Y matrix is a logical representation of a multi-vision arrangement that includes said plurality of display devices.

23. The method of claim 22, wherein said steps (b) through (d) are performed for each display device of the multi-vision system.

24. The method of claim 23, further comprising:
(e) respectively displaying the scaled image portion of each display device.

25. The method of claim 22, wherein each display device is connected to a dedicated user interface and wherein the multi-vision arrangement information is input to the display device by a user operation of each user interface.

26. A multi-vision system, comprising:
a plurality of display devices for simultaneously receiving a video signal; and
a plurality of dedicated user interfaces for inputting multi-vision arrangement information to each of said display devices, the multi-vision arrangement information defining an X×Y matrix and identifying a relative position of at least one display device with respect to the X×Y matrix, by displaying on a display screen of the at least one display device a set of windows arranged in correspondence to the X×Y matrix and selecting one window from the displayed windows, the selected window corresponding to the relative position of the at least one display device,
wherein each display device includes a controller for assigning to the corresponding display device an image portion of the received video signal based on the correspondingly input multi-vision arrangement information, a video processor for scaling the assigned image portion according to a display resolution, and a display unit for displaying the scaled image portion, and
wherein the X×Y matrix is a logical representation of a multi-vision arrangement that includes said plurality of display devices.

27. The multi-vision system of claim 26, wherein the display resolution is constant for each of said plurality of display devices.

28. A multi-vision system, comprising:
a source of a video signal;
a user interface for inputting multi-vision arrangement information from a user, the multi-vision arrangement information defining an X×Y matrix and identifying a row and column of the X×Y matrix; and
at least one display device for displaying on a display screen of said at least one display device a set of windows arranged in correspondence to the X×Y matrix, to enable a user selection of one window from the displayed windows based on a visual observation of the displayed windows, said at least one display device comprising:
a controller, connected to said user interface, for receiving the multi-vision arrangement information and for outputting a control signal assigning to the display device an image portion of the received video signal based on the input multi-vision arrangement information,
a video processor, connected to said video signal source, for receiving the video signal and for scaling the assigned image portion according to a display resolution of said at least one display device and the control signal output from said controller, and
a display unit for displaying the scaled image portion output from said video processor,
wherein the input multi-vision arrangement information indicates a multi-vision arrangement including said at least one display device and indicates by column and row a physical position of said at least one display device in the multi-vision arrangement.

* * * * *